United States Patent [19]

Greenspan

[11] 4,392,807
[45] Jul. 12, 1983

[54] APPARATUS FOR CLOSING TUBES

[76] Inventor: Donald J. Greenspan, 235 Pavilion Ave., Riverside, N.J. 08075

[21] Appl. No.: 262,698

[22] Filed: May 11, 1981

Related U.S. Application Data

[60] Continuation of Ser. No. 96,339, Nov. 21, 1979, abandoned, which is a division of Ser. No. 965,511, Dec. 1, 1978, Pat. No. 4,219,525, which is a continuation of Ser. No. 770,786, Feb. 22, 1977, abandoned.

[51] Int. Cl.³ ............................................. B29C 24/00
[52] U.S. Cl. .................................................. 425/393
[58] Field of Search ................ 425/150, 393; 264/296, 264/322

[56] References Cited

U.S. PATENT DOCUMENTS

| 2,876,496 | 3/1959 | Murphy | 264/294 |
| 2,900,665 | 8/1959 | Walker |  |
| 3,300,559 | 1/1967 | Bachr | 264/323 |
| 3,929,943 | 12/1975 | Klimaszewski | 264/320 X |

FOREIGN PATENT DOCUMENTS 1099064  1/1968  United Kingdom .

*Primary Examiner*—Thomas P. Pavelko
*Attorney, Agent, or Firm*—Woodcock, Washburn, Kurtz, Mackiewicz & Norris

[57] ABSTRACT

A bottom in a tube having an open end is formed by heating the tube and a supporting mandrel and advancing a sleeve over the end of the tube which flares outwardly after heating so as to collapse the flared end. The collapsed end of the tube is closed by contacting the collapsed end with a mold which cooperates with the sleeve to form the bottom.

51 Claims, 5 Drawing Figures

APPARATUS FOR CLOSING TUBES

This is a continuation of application Ser. No. 096,339, filed Nov. 21, 1979, now abandoned which is a division of 965,511, filed Dec. 1, 1978, now U.S. Pat. No. 4,219,525, which was a continuation of Ser. No. 770,786 filed Feb. 22, 1977, now abandoned.

BACKGROUND OF THE INVENTION

This invention relates to closing thermoplastic tubes having an open end so as to form a tube bottom from the material of the previously open ended tube.

It is known that the end of an open tube comprising a thermoplastic material may be closed without attaching a separate piece to form the bottom. U.S. Pat. No. 2,876,496—Murphy, Jr. discloses a method and apparatus for closing an open ended tube at one end by initially heating the end so as to flare the end outwardly. A sleeve is then advanced over the flared end to collapse the outwardly flared end. Subsequently, a mandrel is inserted into the tube and a die or mold cooperates with the tube and the sleeve to close the collapsed end. There is no heating of the mandrel which is inserted into the tube prior to closing. It is significant that the patent only discloses the closing of small size tubes, e.g., catheter tubing having an internal diameter of 0.190 inches.

U.S. Pat. No. 3,300,559—Baehr also discloses a method and apparatus for closing the open end of thermoplastic tubes. The open end of the tube which is mounted on a mandrel is brought into contact with a cup-like member. A heating element is then brought into heating engagement with the cup-like member on the side opposite the open end while the mandrel carrying the tube is advanced so as to collapse and close the end of the tube. The heating member is then retracted while the tube remains in contact with the cup-like member. The cup-like member is then cooled and the closed tube is subsequently retracted from the cooled cup-like member. There is no heating of the mandrel.

U.S. Pat. No. 3,509,252—Baehr discloses a method and apparatus similar to that disclosed in the aforesaid Baehr patent except that the cup-like member is heated directly. The cup-like member does not necessarily completely close the end of the tube. Rather complete closing of the end of the tube to achieve the finished bottom shape is provided by another cup-like member which is relatively cool. Neither Baehr patent discloses the heating of the mandrel heated in advance of contact by a cup-like member.

SUMMARY OF THE INVENTION

It is an overall object of this invention to provide an improved method and apparatus for closing open-ended tubes.

It is a more specific object of this invention to provide a method and apparatus for closing thermoplastic tubes which may have substantial diameters.

It is another specific object of this invention to provide a method and apparatus for closing thermoplastic tubes in a rapid and efficient manner.

It is a still further specific object of this invention to provide a method and apparatus for closing thermoplastic tubes in a reliable manner.

It is a still further specific object of this invention to provide a method and apparatus for closing thermoplastic tubes so as to assure attractive closed tubes.

In accordance with these and other objects, an open-ended thermoplastic tube is supported on a mandrel extending longitudinally into the tube while heating the mandrel and the tube simultaneously so as to flare the end of the open-ended tube outwardly away from the heated mandrel. The flared end of the tube is then collapsed by contact with a telescoping sleeve surrounding the open-ended tube and the mandrel. The collapsed end is then closed to form the bottom of the tube by contacting the collapsed end by a mold which is substantially cooler in temperature than the mandrel and forming the bottom over the end of the heated mandrel. The mold may then be separated from the bottom and the mandrel and the mandrel subsequently separated from the newly-formed tube bottom and removed from the tube.

In accordance with one important aspect of the invention, the mandrel and the open-ended tube are heated radiantly from the source located adjacent the open end of the tube. Preferably, the tube and the mandrel are heated substantially longer than the mold contacts the collapsed end of the tube. It is also desirable to heat the sleeve simultaneously with the mandrel and to advance the sleeve during heating so as to optimize the collapsing of the flared end.

In accordance with another important aspect of the invention, a plurality of open-ended tubes are simultaneously supported by a plurality of mandrels respectively. Preferably, the plurality of tubes supported by the plurality of mandrels are simultaneously heated, subsequently and simultaneously heated and collapsed and subsequently and simultaneously closed. Where the open-ended tubes are supported by a plurality of mandrels, it is preferred to contact the collapsed ends of the tubes with a resiliently mounted mold so as to compensate for varying lengths of tubes.

In order to simultaneously support the tubes on a plurality of mandrels, a turret may be provided comprising a plurality of mandrels located at each of a plurality of positions on the turret. The steps of heating, heating and collapsing and closing may then be accomplished at a plurality of stations located around the turret.

A BRIEF DESCRIPTION OF THE DRAWINGS

FIGS. 1–4 are sectional views depicting a plurality of steps in the process of closing open-ended tubes in accordance with this invention; and FIG. 5 is a plan view showing a turret for closing a plurality of open-ended tubes during high speed manufacturing.

DETAILED DESCRIPTION OF A PREFERRED EMBODIMENT

Figure 1:
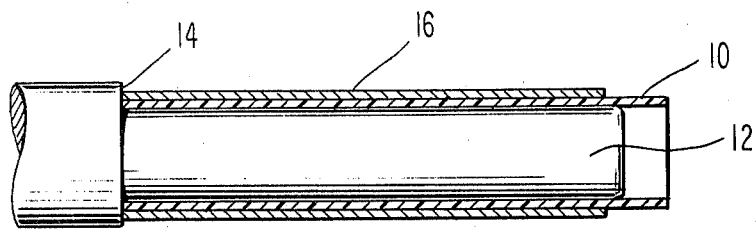

As shown in FIG. 1, an open-ended tube 10 has been mounted on a mandrel 12 as an initial step in a tube closing operation. The mandrel 12 comprises an annular shoulder 14 which is abutted by the end of the tube 10 when supported on the mandrel 12. A sleeve 16 surrounds the tube 10 with the end of the tube 10 which is to be closed extending outwardly beyond the end of the sleeve 16 and the end of the mandrel 12.

Figure 2:
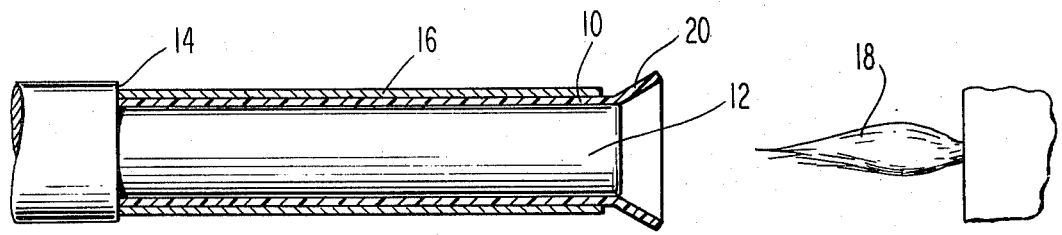

In FIG. 2, the tube 10 as well as the mandrel 12 and the sleeve 16 are heated from a radiant source located opposite and adjacent the end of the mandrel 12, the tube 10 and the sleeve 16. The source as shown in FIG. 2 comprises a gas flame 18 which produces an outward flaring 20 at the end of the tube 10.

Figure 3:
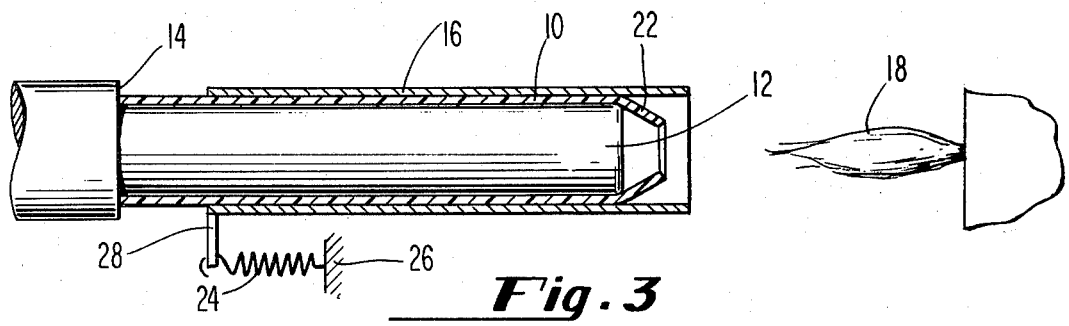

As shown in FIG. 3, the sleeve 16 is advanced while the tube 10, mandrel 12 and tube 16 continue to be heated so as to collapse the end of the tube 10 in the area 22. Sleeve 16 may be advanced by various means. As shown, a spring 24 is provided between an anchoring point 26 and an arm 28. Initially and during the steps depicted by FIGS. 1 and 2 (the spring has been eliminated in these figures for the sake of simplicity), the spring 24 is maintained under tension while the arm 28 is latched in place in a position abutting the shoulder 14 of the mandrel. Then, in FIG. 3, the arm 28 is unlatched so as to drive the sleeve 16 forward to the telescoped position shown in FIG. 3.

Figure 4:
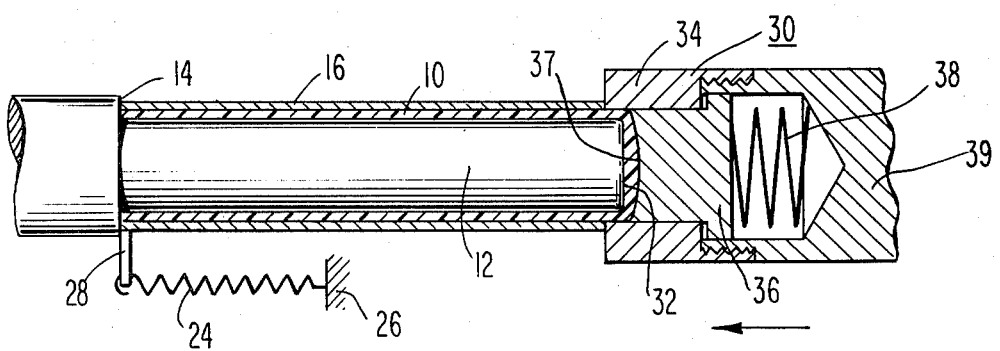

As shown in FIG. 4, a mold assembly 30 is advanced to a position of contact with the end of the sleeve 16 and the collapsed portion 22 of the tube 10 so as to close the tube 10 and form a bottom 32. At this time, the spring 24 attached to the sleeve 16 is again placed under tension which assures that the sleeve 16 is held in contact with the mold assembly 30 to properly form the bottom 32.

The mold assembly 30 comprises two separate sections. A sleeve section 34 has an internal diameter which permits it to slide over the external diameter of tube 10 in contact with the end of the sleeve 16. A central molding section 36 with a slightly concave surface 37 contacts the collapsed portion 22 of the tube 10 so as to form the bottom 32. It will be noted that a spring 38 is provided between the molding section 36 and the end 39 of the molding assembly 30 so as to accommodate a variation in the thickness of the bottom 32 which might result from a longer or shorter tube 10. After closing the end of the tube 10, the molding assembly 30 may be and is retracted almost immediately as will be subsequently described in connection with FIG. 5.

In accordance with this invention, the mandrel 12 is heated simultaneously with the tube 10 and the sleeve 16 so as to permit the end of the mandrel 12 to serve as a molding surface which cooperates with the relatively cool molding assembly 30. It has been found that the heating of the mandrel 12 so as to permit its use as a molding surface permits large-size tubes to be closed. For example, it is possible to close tubes as large as two inches in diameter. Furthermore, the technique provides a very rapid closing of the tube while at the same time producing an attractive product. The speeds with which the ends may be closed is in part attributable to the fact that the molding assembly 30 is not heated, or is at least relatively cool as compared with the mandrel 12 so that it may be separated immediately upon closing the end of the tube 10. Simultaneously with the retraction of the mold assembly 30 and the separation from the bottom 32, the mandrel 12 begins to cool in preparation for the ejection of the tube 10 from the mandrel 12.

Figure 5:
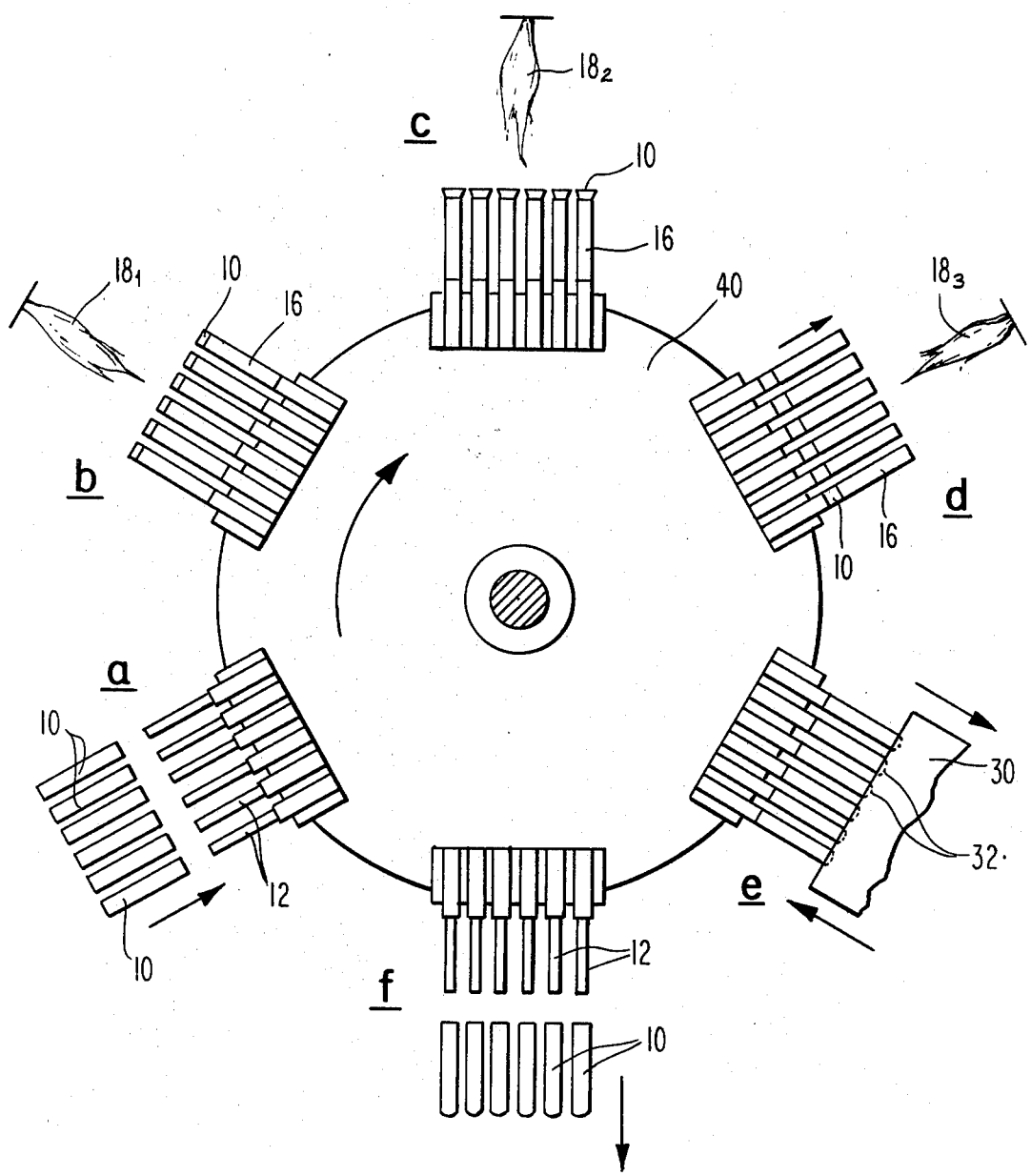

Reference will now be made to FIG. 5 wherein apparatus is shown for achieving a high state of production of tubes having closed ends. As shown in FIG. 5, a turret 40 comprises a plurality of mandrel sets 42 which are adapted to rotate through a plurality of stations a–f.

At station a, a plurality of tubes 10 are fed onto a set of the mandrels 12. The turret 40 is then advanced to the first heating station b wherein a gas heater $18_1$ heats the tubes 10, the mandrels 12 not shown and the sleeves 16. The turret 40 is next advanced to the next heating c wherein the gas heater $18_2$ radiantly heats the tube 10, the mandrels 12 not shown and the sleeves 16. At position d, a gas heater $18_3$ continues to heat the tubes 10, the mandrels 12 and the sleeves 16. However, the sleeves 16 are now advanced so as to collapse the open end of the tubes 10. At station e of the turret, the mold assemblies 30 for each of the plurality of mandrels 12 not shown, are advanced so as to form the closed ends 32 of the tubes and subsequently retracted. Next, the mandrels 12 are advanced to station f where the tubes 10 with the closed bottoms 32 are ejected or extracted from the mandrels 12.

As clearly demonstrated by FIG. 5, the heating of the mandrels 12 rather than the molding assembly 30 permits the molding surface provided by the ends of the mandrels 12 to reach the necessary high temperature without delaying the closure process. In this connection, it will be understood that a molding surface which is too warm may not be separated from the bottom 32 without altering or distorting it. It will be noted that the mandrels 12 have time to cool, i.e., from the time of closing at station e to the time when they reach station f. In fact, cooling has begun when the mandrels 12 leave station d. On the other hand, if the heating were achieved through the molding assembly 30 and the mold sections 36 provided the heated molding surface, cooling of the molds prior to separation from tubes 10 would require that the turret remain sufficiently long at each position so as to allow the molds of the assembly 30 to cool after closing and before the assembly 30 is retracted. This of course increases the time which must be allotted for each position of the turret 40 and thereby delays the tube closure process.

FIG. 5 also depicts the relatively long period of time that the mandrels and the tubes 10 are heated as compared with time taken to close the ends of the tubes to form the bottoms 32. In this regard, it will be noted that the tubes are heated through stations b-d of the turret 40 whereas tube closing takes place only at station e. In this way, the mandrels 12 are able to reach a very high temperature so as to assure the effectiveness of the molding surface provided by those mandrels 12 in preparation for their function at station e when the ends of the tubes are closed. Also note that the resilient mounting of the molding section 36 is particularly important to accomodate the various lengths of tubes 10 which may be mounted on the mandrels of a single set.

It will be appreciated that the method and apparatus disclosed herein may be utilized with a variety of thermoplastic materials. For example, tubes may be closed in accordance with this invention wherein the tubes comprise cellulose butyrate, polypropylene, nylon, teflon and polyethylene. It will also be appreciated that the necessary temperatures which must be achieved from the heaters $18_1$, $18_2$ and $18_3$ will vary as a function of the particular thermoplastic material and the dwell time at each station. In this manner, temperature control of the heating of the tubes is attained in the embodiment heretofore described.

Although a particular embodiment of the invention has been shown and described, it will be understood that other modifications may be made without departing from the true spirit and scope of the invention as set forth in the appended claims. For example, the high speed manufacture achieved by the turret approach might also be achieved by mounting a series of mandrels on a conveyor which is associated with moving work stations positioned along the conveyor. It will also be appreciated that the molding surface need not comprise a mandrel which supports the tube but may comprise another member which is inserted into the tube and heated. It will also be understood that the invention does not necessarily require that the mold outside the tube as contrasted with the molding surface inside the tube be unheated. In fact, it may be desirable with certain materials to heat the mold. Note further, that the mold has been characterized herein as concave although it may also be flat or convex.

What is claimed is:

1. Apparatus for manufacturing a plastic tube having a bottom from an open-ended tube without using additional material for forming the bottom comprising:
   a mandrel for extending longitudinally into said tube and supporting said tube thereon, said mandrel comprising a first portion and a second portion, said second portion extending inwardly of said first portion to form the end of said mandrel;
   a sleeve surrounding said mandrel with a space therebetween for receiving said tube, said sleeve adapted to move relative to said mandrel to collapse the end of said tube to be closed;
   a mold adapted to cooperate with said sleeve and said mandrel for closing the collapsed end of said tube to form said bottom;
   means for heating said mandrel without heating said mold; and
   means for controlling the relative position of said sleeve and said mandrel such that the end of said first portion of said mandrel is substantially aligned with the end of said sleeve during said heating prior to movement of said sleeve with respect to said mandrel.

2. The apparatus of claim 1 wherein said means for heating said mandrel also heats said sleeve without heating said mold.

3. The apparatus of claim 1 wherein said means for heating comprises a source of radiant heat.

4. The apparatus of claim 1 including means for advancing said mandrel and said sleeve from said heating means to said mold means.

5. The apparatus of claim 4 further comprising a turret adapted to rotate past a plurality of stations, said mandrel and said sleeve mounted on said turret, said heating means located at one of said stations and said mold located at another of said stations.

6. The apparatus of claim 5 wherein said heating means is located at more than one of said stations.

7. The apparatus of claim 1 wherein said heating means is adapted to flare the end of said tube outwardly.

8. The apparatus of claim 7 wherein said sleeve is adapted to slide forward over said mandrel to collapse the flared end of said tube after heating.

9. The apparatus of claim 8 wherein said sleeve is adapted to slide forward over said mandrel to collapse the flared end of said tube during heating.

10. The apparatus of claim 9 wherein said sleeve is adapted to slide rearward upon contact with the mold.

11. The apparatus of claim 10 wherein said mold is resiliently mounted.

12. The apparatus of claim 10 wherein said mold comprises a sleeve section and a molding section, said molding section being resiliently mounted relative to said sleeve section so as to accommodate different tube lengths, said sleeve section abutting said sleeves and said molding section cooperating with said heated mandrel to form said bottom.

13. The apparatus of claim 12 comprising a plurality of said mandrels, a plurality of said sleeves and a plurality of said molds, said molds simultaneously cooperating with said mandrels and said sleeves during closure of said tubes.

14. The apparatus according to claim 1 wherein said means for heating said mandrel is also adapted to heat said tube to an extent such that the end of said tube flares outwardly, its flared diameter being greater than the outside diameter of said sleeve, whereby buckling of said flared tube upon the motion of said sleeve relative to said mandrel is avoided.

15. The apparatus of claim 1 wherein a plurality of said mandrels are mounted on plural work stations, and said work stations are adapted to move relative to said means for heating said mandrel and to said mold.

16. Apparatus for manufacturing a plastic tube having a bottom from an open-ended tube without using additional material for forming the bottom comprising:
    a mandrel for extending longitudinally into said tube and supporting said tube thereon;
    means for heating said mandrel and said tube, whereby an end of said tube is flared outwardly;
    a sleeve surrounding said mandrel with a space therebetween for receiving said tube, said sleeve adapted to move relative to said mandrel to collapse said flared end to be closed;
    a mold adapted to cooperate with said sleeve and said mandrel for closing the collapsed end of said tube to form said bottom; and
    means for controlling said means for heating said mandrel and said tube such that said means for heating said mandrel and said tube continue said heating during the collapsing of said flared end.

17. The apparatus of claim 16 wherein said means for heating said mandrel and said sleeve does not heat said mold.

18. The apparatus of claim 16 wherein said means for heating comprises a source of radiant heat.

19. The apparatus of claim 16 including means for advancing said mandrel and said sleeve from said heating means to said mold.

20. The apparatus of claim 19 further comprising a turret adapted to rotate past a plurality of stations, said mandrel and said sleeve mounted on said turret, said heating means located at one of said stations and said mold located at another of said stations.

21. The apparatus of claim 20 wherein said heating means is located at more than one of said stations.

22. The apparatus of claim 16 wherein said sleeve is adapted to slide rearward upon contact with said mold.

23. The apparatus of claim 22 wherein said mold is resiliently mounted.

24. The apparatus of claim 22 wherein said mold comprises a sleeve section and a molding section, said molding section being resiliently mounted relative to said sleeve section so as to accommodate different tube lengths, said sleeve section abutting said sleeves and said molding section cooperating with said heated mandrel to form said bottom.

25. The apparatus of claim 24 comprising a plurality of said mandrels, a plurality of said sleeves and a plurality of said molds, said molds simultaneously cooperating with said mandrels and said sleeves during closure of said tubes.

26. The apparatus of claim 16 wherein said mandrel comprises a first portion and a second portion, said second portion extending inwardly of said first portion to form the end of said mandrel, the end of said first portion being substantially aligned with the end of said sleeve prior to movement of the sleeve with respect to the mandrel.

27. The apparatus according to claim 16 wherein said means for heating said mandrel is also adapted to heat said tube to an extent such that the end of said tube flares outwardly, its flared diameter being greater than the outside diameter of said sleeve, whereby buckling of said flared tube upon the motion of said sleeve relative to said mandrel is avoided.

28. The apparatus of claim 16 wherein a plurality of said mandrels are mounted on plural work stations, and said work stations are adapted to more relative to said means for heating said mandrel and to said mold.

29. An apparatus for manufacturing a plastic tube having a closed end from an open-ended tube without using additional material to form said closed end, comprising:
- a mandrel including a molding surface at one end thereof, said mandrel adapted to fit within and support said tube;
- heating means for heating an open end of said open-ended tube so as to cause said open end to flare outwardly;
- a sleeve disposed generally concentrically about said mandrel and sized to permit fitting of said plastic tube between said sleeve and said mandrel;
- means for controlling the moving of said sleeve relative to said mandrel whereby the end of said sleeve is substantially aligned with the molding surface of said mandrel during the heating of said tube which causes its end to flare outwardly;
- means for moving said sleeve relative to said mandrel and said tube to contact and cause the flared end of said tube to collapse inwardly; and
- mold means adapted to cooperate with said molding surface of said mandrel and with the collapsed end of said tube to shape the exterior surface of said closed end of said tube.

30. The apparatus of claim 29 wherein said heating means continues heating during the collapsing of said flared end.

31. The apparatus of claim 29 wherein said heating means simultaneously heats said molding surface of said mandrel.

32. The apparatus of claim 31 wherein said heating means heats said mandrel and said tube without heating said mold means.

33. The apparatus of claim 29 wherein said heating means comprises a source of radiant heat.

34. The apparatus of claim 29 including means for advancing said mandrel and said sleeve from said heating means to said mold means.

35. The apparatus of claim 34 further comprising a turret adapted to rotate past a plurality of stations, said mandrel and said sleeve mounted on said turret, said heating means located at one of said stations and said mold means located at another of said stations.

36. The apparatus of claim 35 wherein said heating means is located at more than one of said stations.

37. The apparatus of claim 29 wherein said sleeve is adapted to slide rearward upon contact with said mold means.

38. The apparatus of claim 37 wherein said mold means is resiliently mounted.

39. The apparatus of claim 37 wherein said mold means comprises a sleeve section and a molding section, said molding section being resiliently mounted relative to said sleeve section so as to accommodate different tube lengths, said sleeve section abutting said sleeve and said molding section cooperating with said heating mandrel to form said bottom.

40. The apparatus of claim 39 comprising a plurality of said mandrels, a plurality of said sleeves and a plurality of said molds, said molds simultaneously cooperating with said mandrels and said sleeves during closure of said tubes.

41. The apparatus according to claim 29 wherein said heating means is controlled to heat said tube to an extent such that the end of said tube flares outwardly, its flared diameter being greater than the outside diameter of said sleeve, whereby buckling of said flared tube upon the motion of said sleeve relative to said mandrel is avoided.

42. The apparatus of claim 29 wherein a plurality of said mandrels are mounted on plural work stations, and said work stations are adapted to move relative to said means for heating said mandrel and to said mold means.

43. Apparatus for manufacturing a plastic tube having a bottom formed from an open-ended tube without using additional material for forming the bottom comprising:
- a mandrel for supporting the open-ended tube;
- a sleeve disposed around said mandrel and said tube;
- said sleeve and said mandrel being movable relative to one another;
- means for heating said mandrel, said sleeve and said tube simultaneously so as to flare the end of the open-ended tube outwardly away from the heated mandrel;
- means for controlling the relative position of said mandrel with respect to said sleeve such that the end of the mandrel is separated from the end of said sleeve a distance substantially less than the maximum cross-sectional dimension of the tube during said heating;
- said sleeve surrounding said open-ended tube and said mandrel being telescopically movable relative thereto so as to collapse said flared end by contact;
- mold means for closing said collapsed, previously flared end to form said bottom by contacting said collapsed end;
- means for separating said mold from said formed bottom and said mandrel; and
- means for separating said mandrel from said tube after said mold has been separated from said bottom and said mandrel.

44. The apparatus of claim 43 wherein said sleeve is shaped such that substantial contact between the flare end and the sleeve is avoided.

45. The apparatus of claim 43 wherein the tube is flared outwardly a distance substantially greater than the thickness of the sleeve.

46. The apparatus of claim 43 wherein substantially all of the end of said tube extending beyond said mandrel and said sleeve is flared outwardly.

47. The apparatus of claim 43 wherein said mandrel is at least partially cylindrical and the end of said sleeve is substantially aligned with the end of the cylindrical portion of said mandrel.

48. Apparatus for manufacturing a plastic tube having a bottom formed from an open-ended tube without using additional material for forming the bottom comprising:
- a mandrel comprising a first portion and a second portion, said second portion extending inwardly of said first portion to form the end of said mandrel;

a sleeve disposed generally about said mandrel, telescopically movable with respect to said mandrel and sized so as to permit supporting of a tube on said mandrel within said sleeve, the end of said sleeve being substantially aligned with the end of the first portion of said mandrel;

means for heating said mandrel, said sleeve and said tube simultaneously so as to flare the end of the open-ended tube outwardly away from the heated mandrel, the tube being flared outwardly a distance substantially greater than the thickness of the sleeve;

means for controlling the relative position of said sleeve and said mandrel such that the ends of said sleeve and of said first portion of said mandrel are substantially aligned during said heating, and said sleeve being thereafter moved to collapse said flared end by contact with said sleeve surrounding said open-ended tube and said mandrel;

mold means for closing said collapsed previously flared end to form said bottom by contacting said collapsed end;

means for separating said mold from said formed bottom of said mandrel; and means for separating said mandrel from said tube after said mold has been separated from said bottom and said mandrel.

49. The apparatus of claim 48 wherein substantial contact between the flared end and the sleeve is avoided.

50. The apparatus of claim 48 wherein the end of the mandrel is separated from the end of the sleeve during the flaring of said tube a distance substantially less than the maximum cross-sectional dimension of the tube.

51. The apparatus of claim 48 wherein substantially all of the end of said tube extending beyond said mandrel and said sleeve is flared outwardly.

* * * * *